United States Patent
Zahid et al.

(10) Patent No.: US 12,483,100 B2
(45) Date of Patent: Nov. 25, 2025

(54) SHAFT EMBEDDED BRUSH POWER TRANSFER FOR SEPARATELY EXCITED MACHINE POWER

(71) Applicant: GM GLOBAL TECHNOLOGY OPERATIONS LLC, Detroit, MI (US)

(72) Inventors: Muhammad A. Zahid, Troy, MI (US); Khorshed Mohammed Alam, Canton, MI (US); Mazharul Chowdhury, Canton, MI (US); Dumitru Puiu, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 18/480,592

(22) Filed: Oct. 4, 2023

(65) Prior Publication Data

US 2025/0119037 A1    Apr. 10, 2025

(51) Int. Cl.
*H02K 13/02* (2006.01)
*H02K 7/00* (2006.01)
*H02K 11/21* (2016.01)
*H02K 13/00* (2006.01)

(52) U.S. Cl.
CPC ............. *H02K 13/02* (2013.01); *H02K 7/003* (2013.01); *H02K 11/21* (2016.01); *H02K 13/003* (2013.01)

(58) Field of Classification Search
CPC ........ H02K 13/02; H02K 7/003; H02K 11/21; H02K 13/003
USPC .................................................. 310/219–249
See application file for complete search history.

(56) References Cited

U.S. PATENT DOCUMENTS 2,894,155 A * 7/1959 Labastie ................ H02K 9/197
                                                           310/227
2012/0294716 A1 * 11/2012 Roesmann ................ H02P 4/00
                                                           416/1
2018/0323687 A1 * 11/2018 Strasinsky ............. H01R 39/08

FOREIGN PATENT DOCUMENTS

| DE | 102016200766 A1 | 7/2017 |
| DE | 102020120878 A1 | 2/2022 |
| JP | 201417890 A | 1/2014 |

OTHER PUBLICATIONS

German Search Report dated Aug. 21, 2024.

* cited by examiner

*Primary Examiner* — Ahmed Elnakib
(74) *Attorney, Agent, or Firm* — Quinn IP Law

(57) ABSTRACT

A power transfer system for a separately excited machine includes a positive slipring and a negative slipring. One or more positive brushes and one or more negative brushes. A rotor winding attached to rotor laminations and a stator winding attached to stator laminations, such that the stator winding is outside of the rotor winding. The power transfer system may have a hollow shaft. The power transfer system may also have the negative brush and the negative slipring being exterior to the hollow shaft, and one or more position sensors. A shaft ingress separator may be within the hollow shaft and may act as a barrier between wet areas and dry areas. The power transfer system may also include a positive wire and a negative wire, which may be reversed.

20 Claims, 4 Drawing Sheets

SHAFT EMBEDDED BRUSH POWER TRANSFER FOR SEPARATELY EXCITED MACHINE POWER

INTRODUCTION

The present disclosure relates to brush power transfer for separately excited machines. Currently, few technologies exist to use a brush power transfer mechanism for a separately excited machine.

SUMMARY

A power transfer system for a separately excited machine, including a positive slipring; a negative slipring; one or more positive brushes operatively in contact with the positive slipring; one or more negative brushes operatively in contact with the negative slipring. A rotor winding is attached to rotor laminations, which are, generally, exterior to the positive slipring. A stator winding is attached to stator laminations, such that the stator winding is outside of the rotor winding.

The power transfer system may be attached to hollow shaft, such that the rotor laminations are pressed onto the hollow shaft. The negative brushes and the negative slipring may be exterior to the hollow shaft. The power transfer system may include one or more position sensors. A shaft ingress separator may be included within the hollow shaft.

The power transfer system may have a positive wire and a negative wire, and a brush carrier, such that the brush carrier supports the positive wire and the negative wire. There may be at least one set of bearings.

A vehicle having a brush transfer system for a separately excited machine, including a positive brush; a negative brush; one or more positive brushes operatively in contact with the positive slipring; one or more negative brushes operatively in contact with the positive slipring. A rotor winding is operatively attached to one or more rotor laminations exterior to the positive slipring and a stator winding is operatively attached to one or more stator laminations, such that the stator winding is outside of the rotor winding. The brush transfer system may have a hollow shaft, such that the rotor laminations are pressed onto the hollow shaft. A shaft ingress separator may be included within the hollow shaft, such that the shaft ingress separator is a barrier between wet areas and dry areas. A brush carrier may be included within the hollow shaft and at least one set of bearings.

The brush transfer system may have a positive wire and a negative wire, such that the brush carrier supports the positive wire and the negative wire. The brush transfer system may have one or more position sensors. In other configurations, the brush transfer system may have a positive brush carrier within the hollow shaft and a negative brush carrier, such that the negative brush and the negative slipring are exterior to the hollow shaft.

The above features and advantages and other features and advantages of the present disclosure are readily apparent from the following detailed description of the best modes for carrying out the disclosure when taken in connection with the accompanying drawings.

DETAILED DESCRIPTION

Figure 1B:
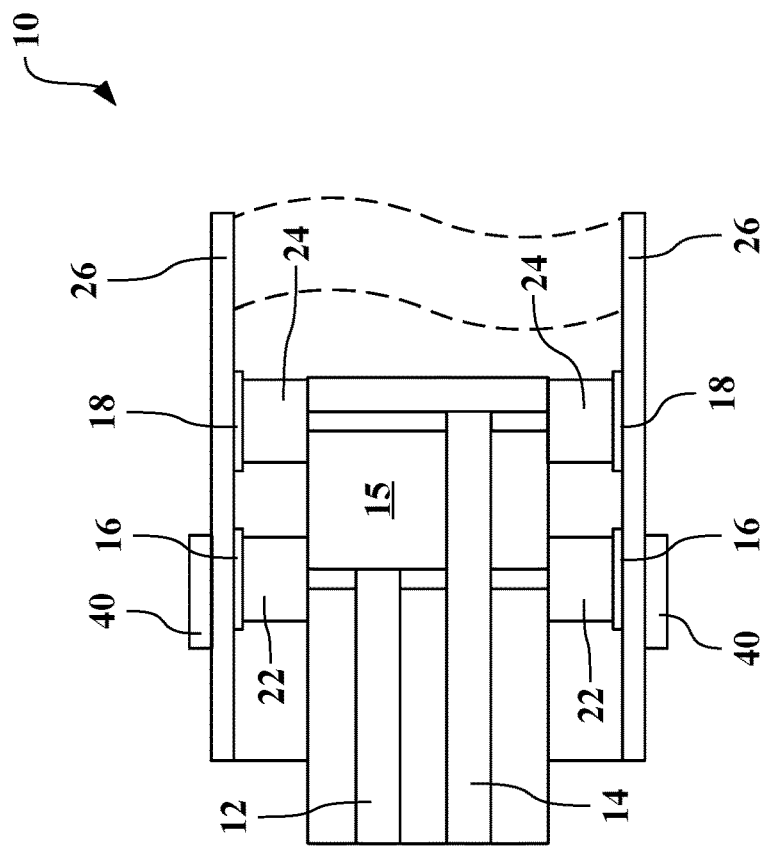
FIG. 1B is a schematic diagram of a side view of a brush power transfer mechanism for separately excited machines.

Referring to the drawings, like reference numbers refer to similar components, wherever possible. In general, a separately excited machine is one where the field winding or coil is energized by a separate or external source. The flux produced by the poles depends upon the field current with the unsaturated region of magnetic material of the poles—i.e., flux is directly proportional to the field current—but in the saturated region, the flux remains constant.

Figure 1A:
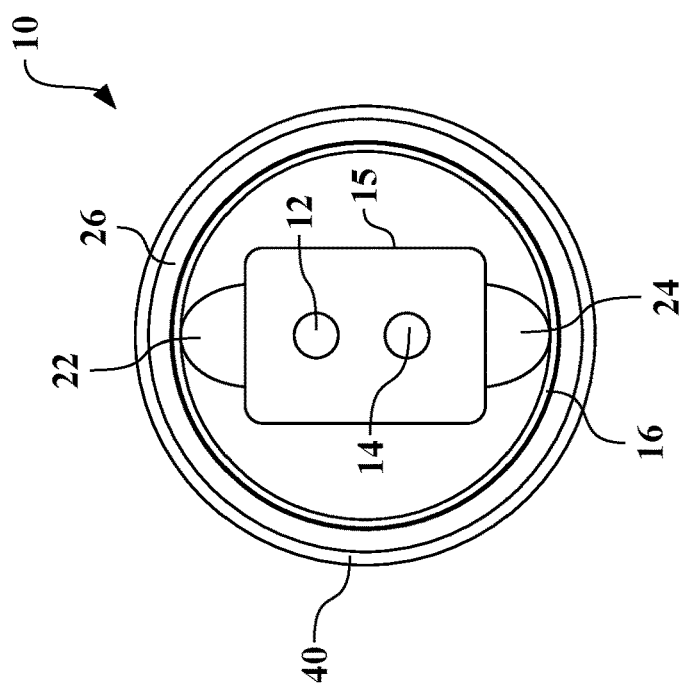
FIG. 1A is a schematic diagram of a front view of a brush power transfer mechanism for separately excited machines.

FIG. 1A is a schematic diagram of a front view of a brush power transfer mechanism or, simply, brush mechanism 10, for separately excited machines. FIG. 1B is a schematic diagram of a side view of the brush mechanism 10. The brush mechanism 10 includes a positive wire 12 and a negative wire 14.

The positive wire 12 and/or the negative wire 14 may be carried, or otherwise supported, by a brush carrier 15. The brush mechanism 10 includes at least one positive slipring 16 and at least one negative slipring 18. Note that the positive wire 12 and the negative wire 14 may be reversed in some configurations.

The brush mechanism 10 further includes one or more positive brushes 22 and one or more negative brushes 24. Additionally, a hollow shaft 26 is included in the brush mechanism 10, and the positive brushes 22 may be within the hollow shaft 26. Note that the hollow shaft 26 is cut off but may extend further.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The term vehicle is broadly applied to any moving platform. Vehicles into which the disclosure may be incorporated include, for example and without limitation: passenger or freight vehicles; autonomous driving vehicles; industrial, construction, and mining equipment; and various types of aircraft.

All numerical values of parameters (e.g., of quantities or conditions) in this specification, including the appended claims, are to be understood as being modified in all instances by the term "about," whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" often refers to relationships that are ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

A generalized control system, computing system, or controller is operatively in communication with relevant components of all systems, and recognizable by those having ordinary skill in the art. The controller includes, for example and without limitation, a non-generalized, electronic control device having a preprogrammed digital computer or processor, a memory, storage, or non-transitory computer-readable storage medium used to store data such as control logic, instructions, lookup tables, etc., and a plurality of input/output peripherals, ports, or communication protocols.

Furthermore, the controller may include, or be in communication with, a plurality of sensors. The controller is configured to execute or implement all control logic or instructions described herein and may be communicating with any sensors described herein or recognizable by skilled artisans. Any of methods described herein may be executed by one or more controllers.

Figure 2:
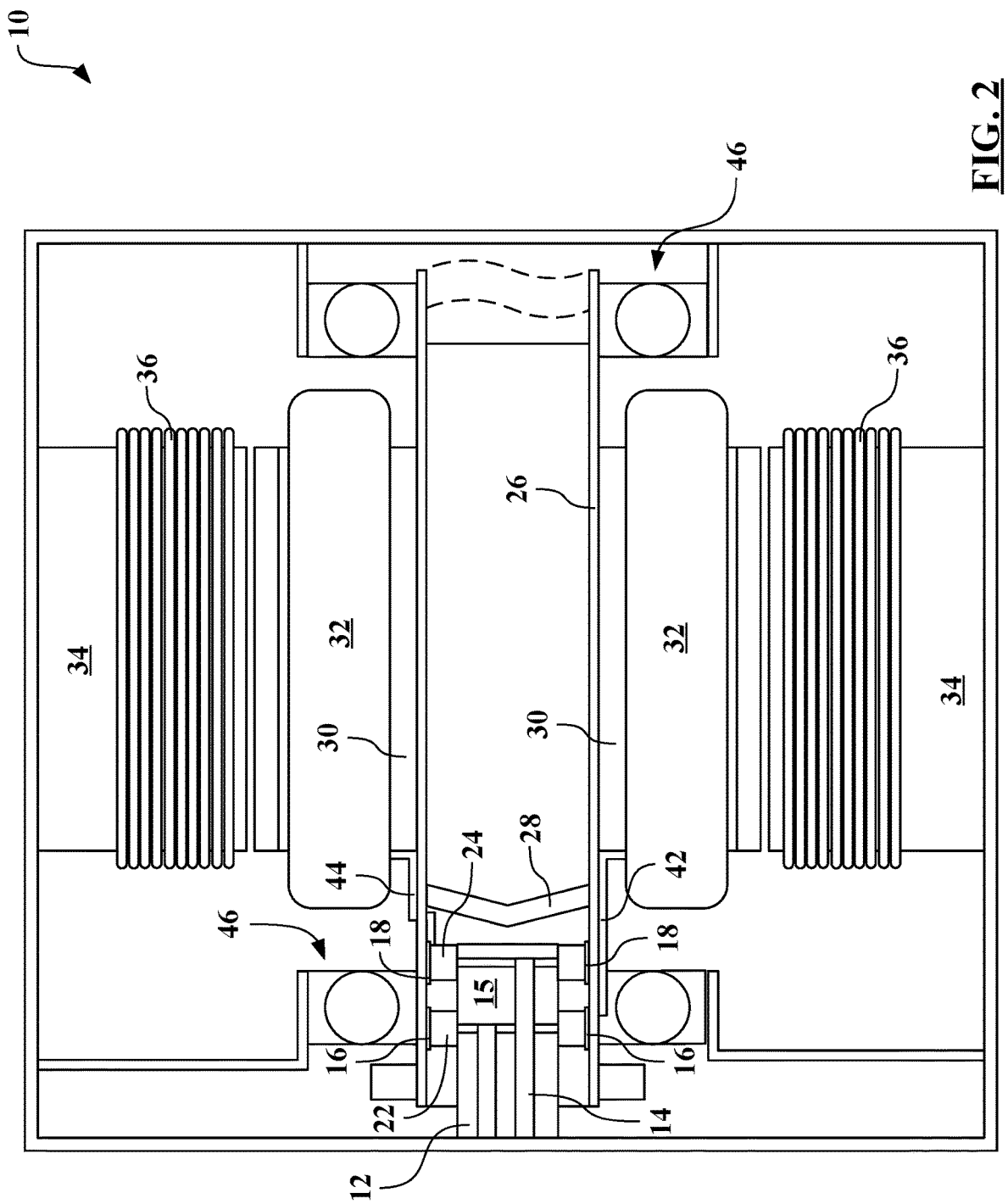
FIG. 2 is a schematic diagram of a brush power transfer mechanism for separately excited machines, which may be used in dry environments.
Figure 3:
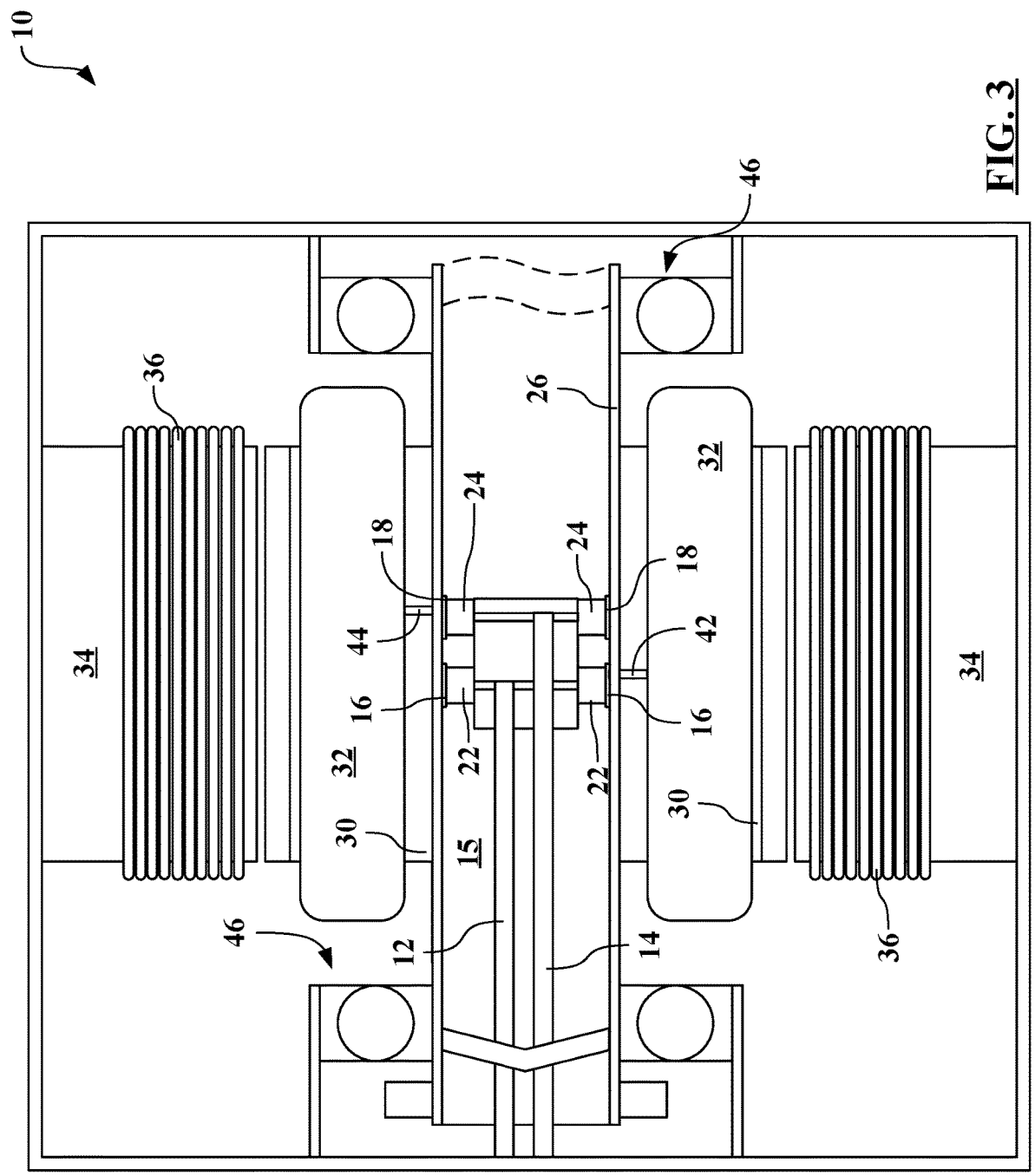
FIG. 3 is a schematic diagram of a brush power transfer mechanism for separately excited machines, which may be used in wet environments.

FIG. 2 is a schematic diagram of the brush mechanism 10, which may be used in dry environments. FIG. 3 is a schematic diagram of the brush mechanism 10, which may be used in wet environments.

The brush mechanism 10 has one or more rotor laminations 30, or a rotor pole 30, which may be pressed onto the hollow shaft 26 or otherwise attached. A rotor winding 32 is generally attached to the rotor laminations 30. Stator laminations 34, or a stator pole 34, are operatively attached to a stator winding 36. In most situations, the stator winding 36 is outside of the rotor winding 32.

The brush mechanism 10 may have a shaft ingress separator 28 within the hollow shaft 26. The shaft ingress separator 28 may be used to separate one or more dry areas from one or more wet areas. The brush mechanism 10 may have one or more position sensors 40, which may be interior to or exterior to the hollow shaft 26. Note that the position sensors 40 are not shown in all figures, as they may not be required.

A positive wire 42 and a negative wire 44 connect the positive wire 12 and the negative wire 14 to the rotor laminations 30 and the stator laminations 34. Note that, like the positive wire 12 and the negative wire 14, the positive wire 42 and the negative wire 44 may be reversed in some configurations. At least one set of bearings 46, as shown in the figures there are, generally, two sets of bearings 46.

Figure 4B:
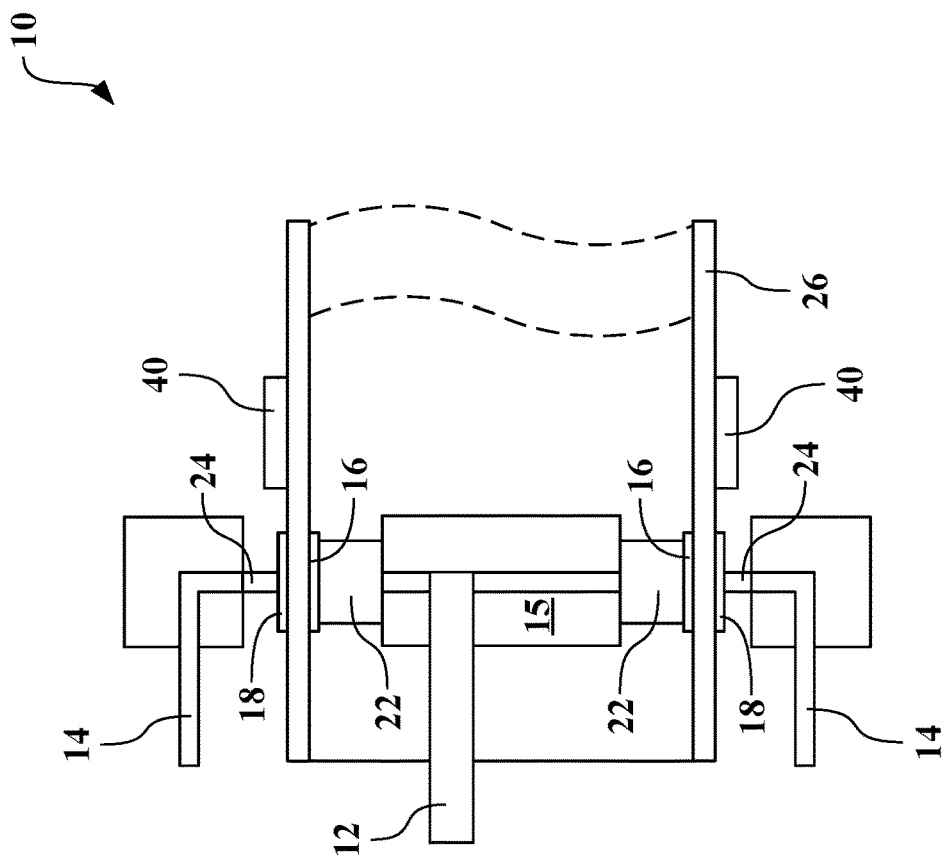
FIG. 4B is a schematic diagram of a side view of a brush power transfer mechanism for separately excited machines, with an exterior negative brush.
Figure 4A:
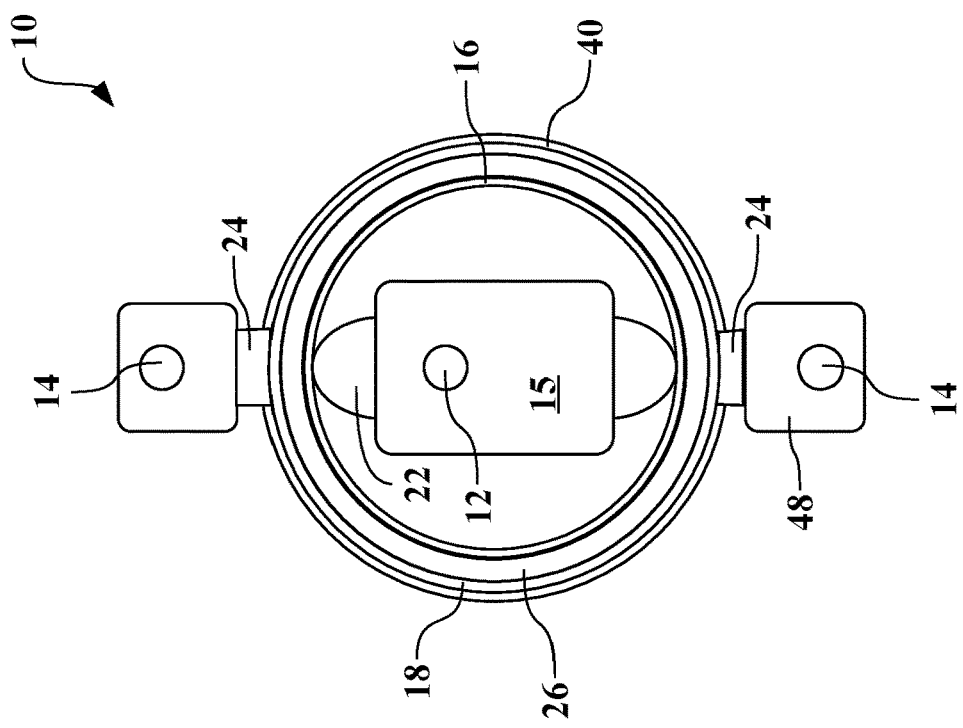
FIG. 4A is a schematic diagram of a front view of a brush power transfer mechanism for separately excited machines, with an exterior negative brush.

FIG. 4A is a schematic diagram of a front view of the brush mechanism 10, with the negative slipring 18 exterior the hollow shaft 26. FIG. 4B is a schematic diagram of a side view of the brush mechanism 10, with an exterior negative brush 24 and the negative slipring 18 are both exterior to the hollow shaft 26. This version includes a negative brush carrier 48, such that there is a positive brush carrier 15. Note that, in all situations, the positive wire 12 and the negative wire 14, and all related components, may be switched depending on the configuration.

Among the benefits of the brush mechanism 10, are, without limitation: reducing the need for axial length increase due to rotor power transfer required for a separately excited machine; higher speed operation; optimizes heat rejection and dissipation with the wet environments version; power transfer is placed inside the hollow shaft and the shaft acts as a shield to mitigate the external electromagnetic interference (EMI); removes the need for a dry environment to house the rotor power transfer and additional components such as sealed bearings; saves cost, by removing wear items such as brushes for rotor power transfer; and/or reduces the risk of producing brush wear debris and frictional losses due to moving interface contact and contact loss arcing.

The detailed description and the drawings or figures are supportive and descriptive of the subject matter herein. While some of the best modes and other embodiments have been described in detail, various alternative designs, embodiments, and configurations exist.

Furthermore, any examples shown in the drawings, or the characteristics of various examples mentioned in the present description, are not necessarily to be understood as examples independent of each other. Rather, it is possible that each of the characteristics described in one of the examples of an embodiment can be combined with one or a plurality of other desired characteristics from other examples, resulting in other examples not described in words or by reference to the drawings. Accordingly, such other examples fall within the framework of the scope of the appended claims.

The invention claimed is:

1. A power transfer system for a separately excited machine, comprising:
   a positive slipring;
   a negative slipring;
   one or more positive brushes operatively in contact with the positive slipring;
   one or more negative brushes operatively in contact with the negative slipring;
   a rotor winding attached to rotor laminations, which are exterior to the positive slipring;
   a stator winding attached to stator laminations, wherein the stator winding is outside of the rotor winding;
   a hollow shaft, wherein the rotor laminations are pressed onto the hollow shaft;
   a shaft ingress separator within the hollow shaft.

2. The power transfer system of claim 1, further comprising:
   a shaft ingress separator within the hollow shaft.
3. The power transfer system of claim 2, further comprising:
   a positive wire;
   a negative wire; and
   a brush carrier, wherein the brush carrier supports the positive wire and the negative wire.
4. The power transfer system of claim 3, further comprising:
   at least one set of bearings.
5. The power transfer system of claim 1, further comprising:
   one or more position sensors.
6. The power transfer system of claim 5, further comprising:
   a positive brush carrier within the hollow shaft; and
   a negative brush carrier exterior to the hollow shaft.
7. A brush transfer system for a separately excited machine, comprising:
   a positive brush;
   a negative brush;
   one or more positive brushes operatively in contact with the positive slipring;
   one or more negative brushes operatively in contact with the positive slipring;
   a rotor winding attached to one or more rotor laminations and exterior to the positive slipring;
   a stator winding attached to one or more stator laminations, wherein the stator winding is outside of the rotor winding;
   a hollow shaft, wherein the rotor laminations are pressed onto the hollow shaft; and
   a shaft ingress separator within the hollow shaft, wherein the shaft ingress separator is a barrier between wet areas and dry areas.
8. The power transfer system of claim 7, further comprising:
   one or more position sensors.
9. The power transfer system of claim 8, further comprising:
   a brush carrier within the hollow shaft; and
   at least one set of bearings.
10. The power transfer system of claim 9, further comprising:
    a negative brush carrier, wherein the negative brush and the negative slipring are exterior to the hollow shaft.
11. The brush transfer system of claim 7, further comprising:
    one or more position sensors; and
    at least one set of bearings.
12. The brush transfer system of claim 7, further comprising:
    at least one set of bearings; and
    a brush carrier within the hollow shaft.
13. The brush transfer system of claim 7, further comprising:
    a positive brush carrier within the hollow shaft; and
    a negative brush carrier exterior to the hollow shaft.
14. A vehicle having a brush transfer system for a separately excited machine, comprising:
    a positive brush;
    a negative brush;
    one or more positive brushes operatively in contact with the positive slipring;
    one or more negative brushes operatively in contact with the positive slipring;
    a rotor winding attached to one or more rotor laminations exterior to the positive slipring;
    a stator winding attached to one or more stator laminations, wherein the stator winding is outside of the rotor winding;
    a hollow shaft, wherein the rotor laminations are pressed onto the hollow shaft;
    a shaft ingress separator within the hollow shaft, wherein the shaft ingress separator is a barrier between wet areas and dry areas;
    a brush carrier within the hollow shaft; and
    at least one set of bearings.
15. The vehicle with the brush transfer system of claim 14, further comprising:
    a positive wire; and
    a negative wire, wherein the brush carrier supports the positive wire and the negative wire.
16. The vehicle with the brush transfer system of claim 15, further comprising:
    one or more position sensors.
17. The vehicle with the brush transfer system of claim 15, further comprising:
    a brush carrier;
    wherein the brush carrier supports the positive wire and the negative wire.
18. The vehicle with the brush transfer system of claim 14, wherein the brush carrier further includes:
    a positive brush carrier within the hollow shaft; and
    a negative brush carrier, wherein the negative brush and the negative slipring are exterior to the hollow shaft.
19. The vehicle with the brush transfer system of claim 18, further comprising:
    one or more position sensors.
20. The vehicle with the brush transfer system of claim 14, further comprising:
    one or more position sensors.

* * * * *